(12) United States Patent
Sirilla

(10) Patent No.: US 7,023,491 B2
(45) Date of Patent: Apr. 4, 2006

(54) METHOD AND DEVICE FOR DISPLAYING FROZEN PICTURES ON VIDEO DISPLAY DEVICE

(75) Inventor: George Andrew Sirilla, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 531 days.

(21) Appl. No.: 09/956,332

(22) Filed: Sep. 19, 2001

(65) Prior Publication Data

US 2002/0118297 A1 Aug. 29, 2002

Related U.S. Application Data

(60) Provisional application No. 60/272,175, filed on Feb. 28, 2001.

(51) Int. Cl.
*H04N 5/44* (2006.01)

(52) U.S. Cl. .................. 348/559; 348/560; 348/558

(58) Field of Classification Search ............. 348/559, 348/560, 554, 555, 558, 458, 446, 447; 375/240.18, 375/240.25, 240.27; H04N 5/44

See application file for complete search history.

(56) References Cited

U.S. PATENT DOCUMENTS

| | | | |
|---|---|---|---|
| 4,272,787 A * | 6/1981 | Michael et al. ............. 348/559 |
| 4,679,084 A * | 7/1987 | Topper et al. ............. 348/559 |
| 5,317,399 A | 5/1994 | Satake et al. |
| 5,592,299 A * | 1/1997 | Boyce et al. ............... 386/68 |
| 5,598,212 A | 1/1997 | Moon et al. ............... 348/403 |
| 5,625,421 A | 4/1997 | Faroudja et al. ........... 348/607 |

(Continued)

FOREIGN PATENT DOCUMENTS

EP 0371678 6/1990

(Continued)

OTHER PUBLICATIONS

Patti, A. J. et al.: "Robust Methods for High-Quality Stills from Interlaced Video in the Presence of Dominant Motion", IEEE Transactions on Circuits and Systems for Video Technology, IEEE Inc., New York, U.S., Vol. 7, No. 2, Apr. 1, 1997, pp. 328-342, XP000687651, ISSN: 1051-8215.

*Primary Examiner*—John Miller
*Assistant Examiner*—Trang U. Tran
(74) *Attorney, Agent, or Firm*—Joseph J. Laks; Ronald H. Kurdyla; Guy H. Eriksen

(57) ABSTRACT

A method and apparatus for constructing a frozen picture to be displayed on a display device in a video data decoding system; the apparatus and method including the steps of receiving video data to be spatially and temporally reconstructed in the decoding system, first determining whether a descriptor of the video data for indicating types of source material from which the video data has originated is in error, second determining whether the descriptor indicates progressive or non-progressive, displaying a frame picture of the video data to construct a frozen picture when the descriptor is not in error in the first determining step and the descriptor indicates progressive in the second determining step, and displaying one of field pictures of the video data to construct a frozen picture when the descriptor is in error in the first determining step or the descriptor indicates non-progressive in the second determining step.

15 Claims, 3 Drawing Sheets

U.S. PATENT DOCUMENTS

| | | | |
|---|---|---|---|
| 5,737,023 A | 4/1998 | Linzer | 348/416 |
| 5,778,143 A | 7/1998 | Boyce | 386/111 |
| 5,874,995 A | 2/1999 | Naimpally et al. | 348/384 |
| 5,974,184 A | 10/1999 | Eifrig et al. | 382/236 |
| 5,991,447 A | 11/1999 | Eifrig et al. | 382/236 |
| 6,026,195 A | 2/2000 | Eifrig et al. | 382/236 |
| 6,028,632 A | 2/2000 | Siong et al. | 348/385 |
| 6,034,733 A | 3/2000 | Balram et al. | 348/448 |
| 6,055,018 A | 4/2000 | Swan | 348/448 |
| 6,069,662 A * | 5/2000 | Horiuchi et al. | 348/446 |
| 6,108,027 A | 8/2000 | Andrews et al. | 348/15 |
| 6,108,039 A | 8/2000 | Linzer et al. | 348/398 |
| 6,118,491 A | 9/2000 | Wu et al. | 348/526 |
| 6,188,725 B1 | 2/2001 | Sugiyama | 375/240 |
| 6,256,345 B1 | 7/2001 | Cho | 375/240.08 |
| 6,269,484 B1 | 7/2001 | Simsic et al. | 725/151 |
| 6,278,737 B1 | 8/2001 | Oami | 375/240.2 |
| 6,630,965 B1 * | 10/2003 | Xue et al. | 348/559 |
| 6,654,539 B1 * | 11/2003 | Duruoz et al. | 386/68 |
| 6,690,728 B1 * | 2/2004 | Chang et al. | 375/240.16 |

FOREIGN PATENT DOCUMENTS

| | | |
|---|---|---|
| EP | 0 483 957 | 5/1992 |
| EP | 1182869 | 2/2002 |
| JP | 10 136358 | 5/1998 |

\* cited by examiner

METHOD AND DEVICE FOR DISPLAYING FROZEN PICTURES ON VIDEO DISPLAY DEVICE

This application claims the benefit of U.S. Provisional Application No. 60/272,175, filed Feb. 28, 2001.

TECHNICAL FIELD

The present invention relates to a method of decoding video data, and more particularly, to a method of displaying pictures constructed from progressive or non-progressive video data.

BACKGROUND OF THE INVENTION

In a cathode-ray tube (CRT) display (e.g., television display), several hundred horizontal lines are scanned from top to bottom and from left to right. In a progressive display, each line is scanned in turn from top to bottom to constitute a frame picture. In an interlaced display, the odd-numbered lines and the even-numbered lines are separately and alternately scanned to constitute a separate field picture.

In a CRT display, for example, a frame picture for a progressive display consists of 480 raster lines and the display rate (or refresh rate) is 30 frames per second. In contrast, a field picture for an interlaced display consists of 240 raster lines and the display rate is 60 fields per second. Most televisions are interlaced display devices, and the raster lines are scanned alternately in two interwoven lines, i.e., all of the odd-numbered lines and all of the even-numbered lines.

In digital television broadcast, a digital video decoder (e.g., a set-top box) is used as a device that enables a television set to become a user interface to a communication channel and also enables a television set to receive and decode digital audio/video data. Such digital video decoder is also required to display frozen pictures as well as normal pictures in the digital television broadcast. For example, when a television viewer changes the channel, the digital video decoder of a television set operates to display a frozen picture while it performs initialization and/or satisfies conditions needed for a transition to steady-state video decode/display.

In an interlaced (or non-progressive) display, a frozen picture is displayed by alternately displaying two field pictures, one for the even-numbered lines and the other for the odd-numbered lines. In this mode, the digital video decoder operates to continuously output these two field pictures to a display unit (e.g., CRT display).

When video data is recorded as field pictures, there is a 1/60 second temporal offset between the adjacent field pictures and a corresponding spatial offset for an object in motion. In case that a frozen picture is constructed with two adjacent field pictures, any motion in the picture results in spatial difference between the two fields of the picture because they are temporally separated by an one-field display period. As a result, when a frozen picture is constructed using two adjacent fields of a picture, areas of motion in the frozen picture displayed will appear to vibrate as the two fields are alternately displayed. The higher the degree of motion, the more noticeable and bothersome the vibration.

Therefore, a need exists for a method of constructing frozen pictures which have substantially no vibration or the like in either progressive or non-progressive displays.

SUMMARY OF THE INVENTION

In an aspect of the present invention, there is provided a method for constructing a frozen picture to be displayed on a display device in a video data decoding system. The method comprising the steps of receiving video data to be spatially and temporally reconstructed in the decoding system, the video data including fields constituting a picture to be displayed on the display device; selecting one of the fields constituting the picture; and displaying the selected one of the fields on the display device for a time period to display the fields constituting the picture. The receiving video data step preferably includes dividing a frame picture into the fields constituting a picture when the video data has originated from progressive source material. The fields constituting a picture may also be field pictures to be displayed alternately for a non-progressive display when the video data has originated from non-progressive source material, and one of the field pictures is preferably displayed for a time period to display the two field pictures.

In another aspect of the present invention, the method for constructing a frozen picture may include the steps of receiving video data to be spatially and temporally reconstructed in the decoding system; first determining whether a descriptor of the video data for indicating types of source material from which the video data has originated is in error; second determining whether the descriptor indicates progressive or non-progressive; displaying a frame picture of the video data to construct a frozen picture when the descriptor is not in error in the first determining step and the descriptor indicates progressive in the second determining step; and displaying one of field pictures of the video data to construct a frozen picture when the descriptor is in error in the first determining step or the descriptor indicates non-progressive in the second determining step.

When the descriptor indicates non-progressive, the step of displaying one of field pictures may include selecting one of field pictures constituting a picture, and displaying the selected one of the field pictures for a time period to display the field pictures constituting the picture. When the descriptor is in error in the first determining step, the step of displaying one of field pictures may include dividing a frame picture for a progressive display into the fields constituting a picture when the video data has originated from progressive source material, selecting one of the fields, and displaying the selected one of the fields on the display device for a time period to display the frame picture.

DETAILED DESCRIPTION

In video data compression and decompression, an evolving set of standards are developed by the Moving Pictures Experts Group (MPEG). They are referred to as MPEG standards. For the digital television broadcast, a typical digital video decoder (incorporated within a set-top box, for example) contains an MPEG video decoder chip besides one or more microprocessors for running the operating system.

Figure 1:
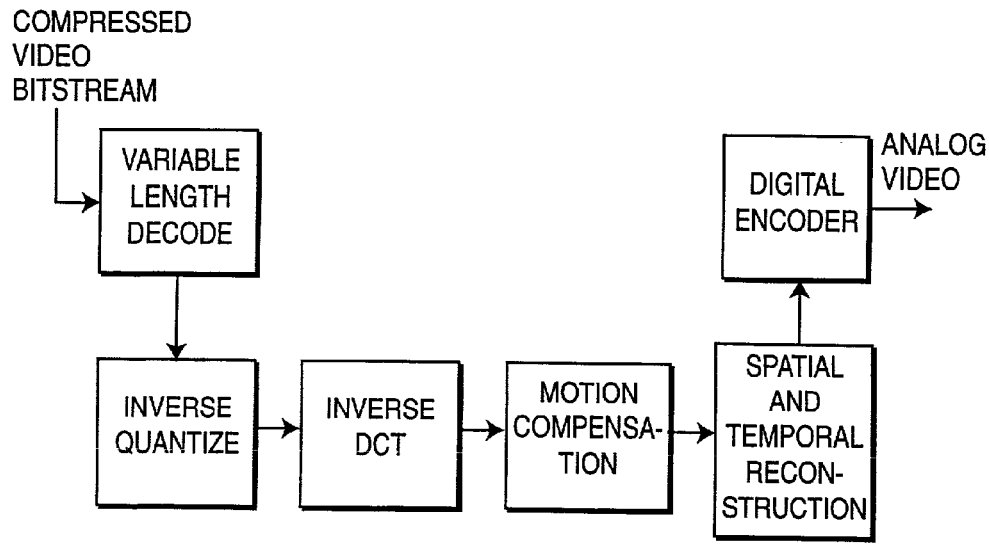
FIG. 1 is a block diagram illustrating a digital video decoder over which the present invention may be implemented.

FIG. 1 is a block diagram illustrating a digital video decoder compliant with the MPEG standards and over which the principles of the present invention may be practiced. In the digital video decoder, a video bitstream compressed by an encoder is converted into an analog video signal through various processes such as variable length decoding, inverse quantization, inverse discrete cosine transform (IDCT), motion compensation, spatial and temporal reconstruction, and video output encoding.

Of the various processes of decoding the compressed video bitstream, the present invention is pertinent to the spatial and temporal reconstruction process. The variable length decoding, inverse quantization, IDCT, motion compensation, and digital encoding of the digital video decoder in FIG. 1 are well known in this art, thus a detailed description thereof is omitted.

The spatial and temporal reconstruction of digital video data, in accordance with the principles of the present invention, includes the processing of picture information relating to field and frame pictures and may further include vertical and horizontal scaling and filtering. The spatial and temporal reconstruction, in accordance with the principles of the present invention, are described in greater detail in conjunction with the description pertaining to FIGS. 2 through 4.

Encoded video data can be decoded as frame pictures for a progressive display or as field pictures for a non-progressive (or, interlaced) display. In case of video data compliant with the MPEG standards, a video data syntax provides a descriptor called "progressive_frame_flag" to indicate which method (i.e., progressive or non-progressive) was used in the encoding process. In other words, the descriptor in a video data syntax is used for indicating types of source material from which the video data to be decoded has originated.

Figure 2:
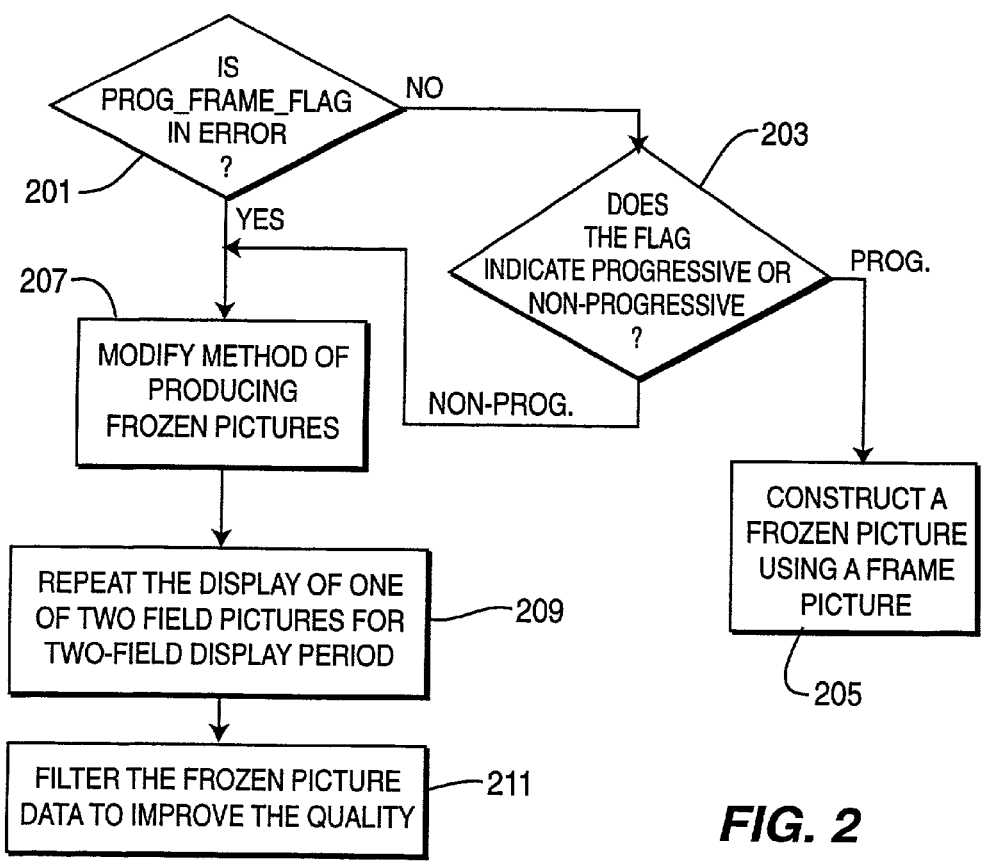
FIG. 2 is a flow chart for describing a method of constructing a frozen picture according to a first embodiment of the present invention.

Referring to FIG. 2, a flow chart is provided for describing the method of constructing frozen pictures, in accordance with the principles of the present invention. Assuming that the validity (or trustworthiness) of a descriptor in video data to be decoded is known, it is first determined whether the descriptor (e.g., progressive_frame_flag) may be in error based on the validity (step 201).

When it is determined that the descriptor is not in error, it is then determined whether the descriptor indicates "progressive" or "non-progressive" (step 203). It should be noted that the determination of whether the descriptor indicates progressive or non-progressive may be performed prior to the determination of whether the descriptor may be in error.

In case that the descriptor indicates "progressive" (i.e., the encoded video data has originated from progressive source material), a frozen picture is constructed using a pertinent frame picture of video data to be decoded (step 205). To display a frozen picture, the video decoder outputs the frame picture to a display device for a frame display period, i.e., a time period for displaying a frame picture in a progressive display.

When the descriptor indicates "non-progressive" in step 203 or when the descriptor may be in error in step 201, it is necessary to modify the method of constructing frozen pictures (step 207). In this case, a frozen picture needs to be reconstructed with one of two fields constituting a picture in a non-progressive display.

Figure 3A:
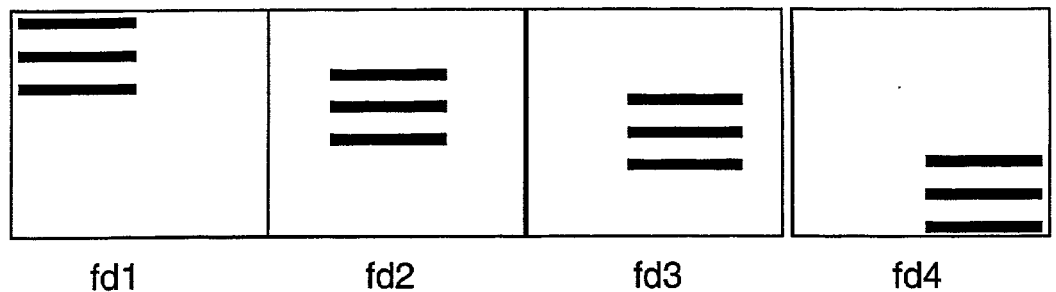
FIGS. 3A and 3B show a sequence of field pictures and a frame picture reconstructed from two adjacent fields.
Figure 3B:
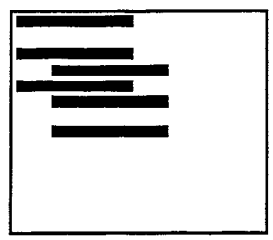

FIG. 3A, for example, depicts a sequence of four field pictures fd1, fd2, fd3, fd4 of an object in motion for an interlaced display. In this case, if a frozen picture is constructed with two adjacent fields, the object will appear to jump between the two field positions as shown in FIG. 3B. This may result in vibration or flicker in the frozen picture.

According to the method of constructing frozen pictures in the present invention, a frozen picture is constructed by displaying one field picture for a two-field display period, i.e., a time period for displaying two field pictures in a non-progressive display. Referring to FIGS. 2 and 3A, a frozen picture is constructed by repeatedly displaying one of the field pictures fd1 and fd2 for the time period of displaying both the field pictures fd1 and fd2 (step 209). This method may eliminate any vibration or the like in the frozen picture.

Upon constructing a frozen picture, video data of the frozen picture may be filtered to improve display quality of the picture (step 211). The filtering may be accomplished by performing weighted interpolation with respect to video data of vertically adjacent field pictures.

In the above-described embodiment of the present invention, constructing a frozen picture requires the determination of whether a descriptor is in error and/or whether a descriptor indicates progressive or non-progressive. In another embodiment of the present invention, however, a frozen picture may be constructed without such determination. This is described below.

Figure 4:
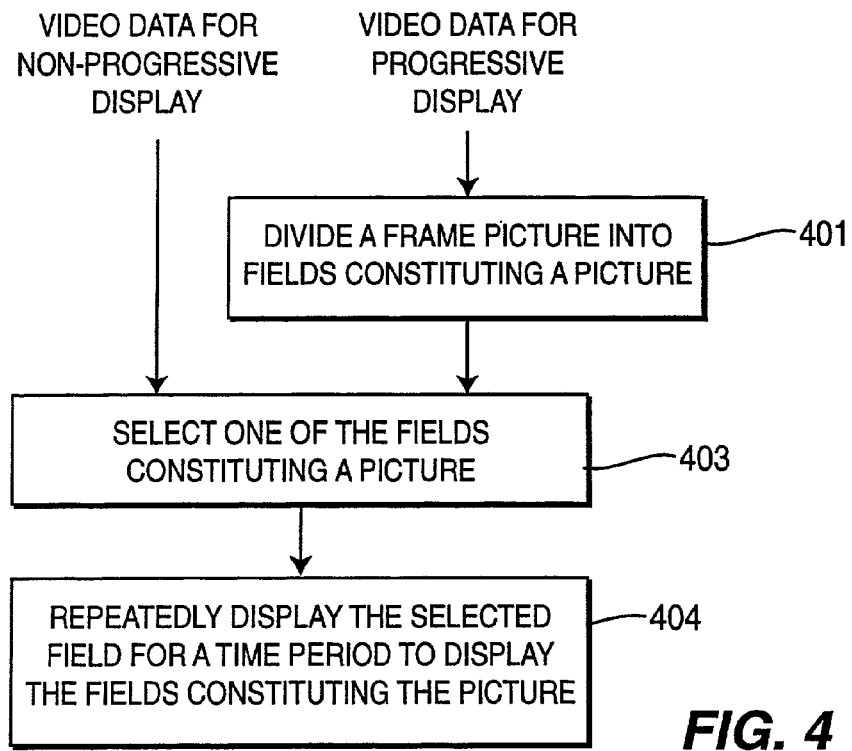
FIG. 4 is a flow chart for describing a method of constructing a frozen picture according to a second embodiment of the present invention.

Referring to FIG. 4, a frozen picture is constructed using one field picture in both the progressive and non-progressive display modes. In a non-progressive display, a frozen picture is constructed using the same method as in the first embodiment shown in FIG. 2. In case of an interlaced display, one of the two fields (referring to FIG. 3A) is selected (step 403), and the selected field is repeatedly displayed for the two-field display period (step 404).

In a progressive display, a frozen picture is constructed using one of the two fields split from a frame picture (step 401). In this case, one of the two fields is selected (step 403) and the selected field is repeatedly displayed for the frame display period (step 404).

Figure 5A:
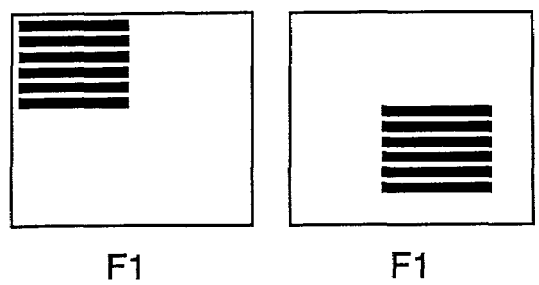
FIGS. 5A and 5B show field pictures for an interlaced display.
Figure 5B:
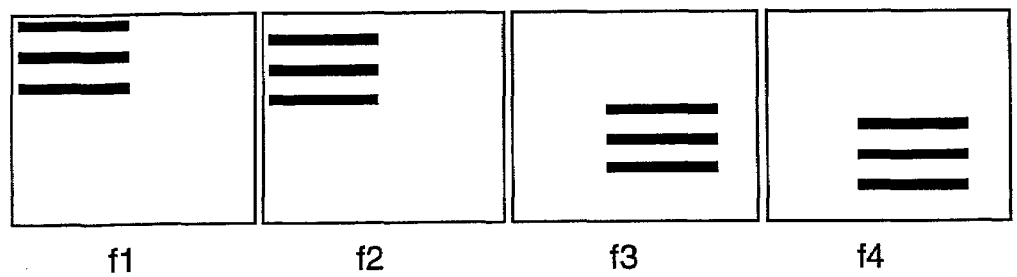

Referring to FIGS. 5A and 5B, one frame picture for a progressive display may be split into two field pictures. For example, frame F1 is split into fields f1 and f2, and frame F2 is split into fields f3 and f4.

In this embodiment, a frozen picture is constructed by repeatedly displaying one of two adjacent fields for the frame display period or the time period for displaying both the adjacent fields. For example, a frozen picture is constructed by repeatedly displaying field f1 for a time period to display frame F1 or both the fields f1 and f2. This is possible because the display of a frozen picture is short and temporary enough to ignore whether the source material to be decoded is progressive or non-progressive. By constructing a frozen picture using this method, any vibration or the like may be eliminated from the frozen picture.

The specific details of implementation is merely a design choice for each embodiment chosen, and may vary depending on the architecture of the decoder, costs of implementing, reliability, etc. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any of the processes, acts, and steps described herein represent various processes which may be substantially represented in computer readable medium and so executed by a computer or processor, whether or not such computer or processor is explicitly shown.

The functions of the various elements shown in the FIGS. 1, 2 and 4 may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

What is claimed is:

1. A method for constructing a frozen picture to be displayed on a display device in a video data decoding system, the method comprising the steps of:
   receiving video data to be spatially and temporally reconstructed in the decoding system;
   first determining whether a descriptor of the video data for indicating types of source material from which the video data has originated is in error;
   second determining whether the descriptor indicates progressive or non-progressive;
   sending a frame picture of the video data to display, for constructing a frozen picture when the descriptor is not in error in the first determining step and the descriptor indicates progressive in the second determining step; and
   sending one of a plurality of field pictures of the video data to display, for constructing a frozen picture when the descriptor is in error in the first determining step or the descriptor indicates non-progressive in the second determining step.

2. The method of claim 1, wherein the video data is compliant with the MPEG standards.

3. The method of claim 2, wherein the descriptor includes a flag for indicating progressive or non-progressive.

4. The method of claim 1, wherein when the descriptor indicates non-progressive in the second determining step, the step of sending one of the plurality of field pictures includes steps of:
   selecting one of a plurality of field pictures constituting a picture; and
   sending the selected one of the field pictures for a time period to display the field pictures constituting the picture.

5. The method of claim 4, wherein the field pictures are two field pictures for an interlaced display, one of the two field pictures being for even-numbered raster lines of the picture and the other for odd-numbered raster lines of the picture.

6. The method of claim 1, wherein when the descriptor is in error in the first determining step, the step of displaying one of field pictures includes the steps of:
   dividing a frame picture for a progressive display into the fields constituting a picture when the video data has originated from progressive source material;
   selecting one of the fields; and
   sending the selected one of the fields to the display device for a time period to display the frame picture.

7. The method of claim 6, wherein the fields divided from the frame picture are two fields, one for even-numbered raster lines of the frame picture and the other for odd-numbered raster lines of the frame picture.

8. The method of claim 1, wherein when the descriptor is in error in the first determining step, the step of sending the selected one of the fields includes the steps of:
   selecting one of fields constituting a picture in a non-progressive display; and
   sending the selected one of the fields to the display device for a time period to display the fields constituting the picture.

9. The method of claim 8, wherein the fields are two field pictures for an interlaced display, the two field pictures being one for even-numbered raster lines of the picture and the other for odd-numbered raster lines of the picture.

10. The method of claim 1, further including filtering video data of the selected one of the fields to improve quality of the frozen picture.

11. A apparatus for constructing a frozen picture to be displayed on a display device in a video data decoding system, comprising:
    means for receiving video data to be spatially and temporally reconstructed in the decoding system;
    means for first determining whether a descriptor of the video data for indicating types of source material from which the video data has originated is in error;
    means for second determining whether the descriptor indicates progressive or non-progressive;
    means for sending a frame picture of the video data to display, for constructing a frozen picture when the descriptor is not in error in the first determining step and the descriptor indicates progressive in the second determining step; and
    means for sending one of a plurality of field pictures of the video data to display, for constructing a frozen picture when the descriptor is in error in the first determining step or the descriptor indicates non-progressive in the second determining step.

12. The apparatus of claim 11, wherein the video data is compliant with the MPEG standards.

13. The apparatus of claim 11, wherein the descriptor includes a flag for indicating progressive or non-progressive.

14. The apparatus of claim 11, wherein the field pictures are two field pictures for an interlaced display, one of the two field pictures being for even-numbered raster lines of the picture and the other for odd-numbered raster lines of the picture.

15. The apparatus of claim 11, further including:
    means for filtering video data of the selected one of the fields to improve quality of the frozen picture.

* * * * *